United States Patent
Kwon et al.

(10) Patent No.: US 10,544,948 B2
(45) Date of Patent: Jan. 28, 2020

(54) AIR CONDITIONER WITH DEHUMIDIFICATION AND HUMIDIFICATION FUNCTION AND METHOD OF DEHUMIDIFIED COOLING AND HUMIDIFIED HEATING USING THE SAME

(71) Applicant: KOREA INSTITUTE OF INDUSTRIAL TECHNOLOGY, Cheonan-si, Chungcheongnam-do (KR)

(72) Inventors: Oh Kyung Kwon, Asan-si (KR); Dong An Cha, Cheonan-si (KR); Kyung Jin Bae, Jeollanam-do (KR)

(73) Assignee: Korea Institute of Industrial Technology, Cheonan-si, Chungcheongnam-do (KR)

( * ) Notice: Subject to any disclaimer, the term of this patent is extended or adjusted under 35 U.S.C. 154(b) by 126 days.

(21) Appl. No.: 15/576,746

(22) PCT Filed: May 24, 2016

(86) PCT No.: PCT/KR2016/005488
§ 371 (c)(1),
(2) Date: Nov. 24, 2017

(87) PCT Pub. No.: WO2016/204418
PCT Pub. Date: Dec. 22, 2016

(65) Prior Publication Data
US 2019/0049128 A1    Feb. 14, 2019

(30) Foreign Application Priority Data
Jun. 19, 2015  (KR) .......................... 10-2015-0087619

(51) Int. Cl.
*F24F 3/14* (2006.01)
*F24F 11/00* (2018.01)
(Continued)

(52) U.S. Cl.
CPC ........ *F24F 3/1411* (2013.01); *F24F 11/0008* (2013.01); *B01D 53/0454* (2013.01); *F24F 11/30* (2018.01); *F24F 2110/20* (2018.01)

(58) Field of Classification Search
CPC ........ F24F 3/1429; F24F 3/14; F24F 11/0008; F24F 2110/20; F24F 2110/22
See application file for complete search history.

(56) References Cited

U.S. PATENT DOCUMENTS 9,649,908 B2 * 5/2017 Takeuchi ................ B60L 50/64
2005/0150237 A1 * 7/2005 Yabu ...................... F24F 3/1411
62/94

(Continued)

FOREIGN PATENT DOCUMENTS

JP      07-265649 A1    10/1995
JP      2006-329593 A   12/2006
(Continued)

Primary Examiner — Nelson J Nieves
(74) Attorney, Agent, or Firm — Rabin & Berdo, P.C.

(57) ABSTRACT

An exemplary embodiment of the present invention provides an air handling unit with dehumidification and humidification functions and dehumidifying and cooling and humidifying and heating methods using the same which are capable of consistently performing dehumidification or humidification without cessation. The air handling unit with the dehumidification and humidification functions according to the exemplary embodiment of the present invention includes a first module which performs dehumidification or humidification, and a second module which performs dehumidification or humidification alternately with the first module.

18 Claims, 8 Drawing Sheets

(51) Int. Cl.
*F24F 110/20* (2018.01)
*F24F 11/30* (2018.01)
*B01D 53/04* (2006.01)

(56) References Cited

U.S. PATENT DOCUMENTS

| | | | | |
|---|---|---|---|---|
| 2005/0257551 | A1* | 11/2005 | Landry | F24F 3/1411 |
| | | | | 62/271 |
| 2007/0240864 | A1* | 10/2007 | Yabu | B01D 53/261 |
| | | | | 165/150 |
| 2009/0038326 | A1 | 2/2009 | Matsui | |
| 2010/0300123 | A1 | 12/2010 | Park et al. | |
| 2011/0192182 | A1* | 8/2011 | Noda | B01D 53/261 |
| | | | | 62/160 |
| 2011/0289944 | A1* | 12/2011 | Ouyang | B60H 1/00328 |
| | | | | 62/61 |
| 2014/0166765 | A1* | 6/2014 | Takahashi | F24F 3/1405 |
| | | | | 236/44 A |
| 2014/0230475 | A1* | 8/2014 | Matsui | F24F 3/1429 |
| | | | | 62/186 |
| 2014/0230480 | A1* | 8/2014 | Sakai | F24F 3/1405 |
| | | | | 62/271 |
| 2016/0009161 | A1* | 1/2016 | Park | B60H 1/22 |
| | | | | 62/324.6 |
| 2016/0137023 | A1* | 5/2016 | Park | B60H 1/00057 |
| | | | | 165/202 |
| 2016/0146479 | A1* | 5/2016 | Fujita | F24F 3/1405 |
| | | | | 62/271 |
| 2016/0231009 | A1* | 8/2016 | Choi | F24F 3/1405 |

FOREIGN PATENT DOCUMENTS

| | | |
|---|---|---|
| JP | 2008-070097 A | 3/2008 |
| KR | 10-0943285 B1 | 2/2010 |
| KR | 10-1363864 B1 | 2/2014 |
| KR | 10-1525849 B1 | 6/2015 |

* cited by examiner

AIR CONDITIONER WITH DEHUMIDIFICATION AND HUMIDIFICATION FUNCTION AND METHOD OF DEHUMIDIFIED COOLING AND HUMIDIFIED HEATING USING THE SAME

CROSS-REFERENCE TO RELATED APPLICATION

This application claims priority to and the benefit of Korean Patent Application No. 10-2015-0087619, filed on Jun. 19, 2015, the disclosure of which is incorporated herein by reference in its entirety.

BACKGROUND OF THE INVENTION

Field of the Invention

Technical Field

The present invention relates to an air handling unit with dehumidification and humidification functions and dehumidifying and cooling and humidifying and heating methods using the same, and more particularly, to an air handling unit with dehumidification and humidification functions and dehumidifying and cooling and humidifying and heating methods using the same which are capable of consistently performing dehumidification or humidification without cessation.

DESCRIPTION OF THE RELATED ART

Background Art

In general, processes of cooling and heating a commercial building are performed by an air handling unit (AHU). Further, for the purpose of dehumidification and humidification, a dehumidifying device used at the time of performing the cooling and a humidifying device used at the time of performing the heating are separately provided.

In the cooling and heating device, a latent heat load is increased due to humid air introduced from the outside at the time of performing the cooling, and as a result, and as a result, there is a problem in that system performance is decreased.

Further, because a dehumidifying rotor is used in the related art, adsorption and desorption of moisture in air are separately performed, and as a result, there is a problem in that dehumidification is ceased during processes in which the moisture is desorbed after adsorption of the moisture is saturated, and then the adsorption is prepared again.

Korean Patent No. 10-1525849 (Title of the Invention: Compressor and Air Handling Unit Using the Same) discloses an air handling unit including a compressor which compresses a refrigerant, an outdoor heat exchanger which performs a heat exchange between outdoor air and the refrigerant, an indoor heat exchanger which performs a heat exchange between indoor air and the refrigerant, and an expansion valve which reduces pressure of the refrigerant, in which the refrigerant uses hydrofluorocarbon.

SUMMARY OF THE INVENTION

Technical Problem

A technical problem to be solved by the present invention is to provide an air handling unit with dehumidification and humidification functions and dehumidifying and cooling and humidifying and heating methods using the same which use a heat exchanger coated with a moisture absorbent and do not use a separate dehumidifying device and a separate humidifying device, thereby reducing electric power consumption and improving spatial utilization by virtue of a simple structure.

Another technical problem to be solved by the present invention is to provide an air handling unit with dehumidification and humidification functions and dehumidifying and cooling and humidifying and heating methods using the same which simultaneously perform adsorption and desorption of moisture in air, thereby performing dehumidification and humidification without cessation.

Yet another technical problem to be solved by the present invention is to provide an air handling unit with dehumidification and humidification functions and dehumidifying and cooling and humidifying and heating methods using the same in which a latent heat load is reduced because dehumidified air flows into a cold water coil at the time of performing the cooling, and deterioration in performance is prevented and costs are reduced because condensate water is not produced and separate piping is not required.

Technical problems to be solved by the present disclosure are not limited to the aforementioned technical problem, and other technical problems, which are not mentioned above, may be clearly understood from the following descriptions by those skilled in the art to which the present disclosure pertains.

Solution to Problem

The present invention, which has been made in an effort to solve the technical problems, provides an air handling unit with dehumidification and humidification functions, the air handling unit including: a first module which performs dehumidification or humidification; and a second module which performs dehumidification or humidification alternately with the first module, in which while one of the first module and the second module performs adsorption of moisture in the passing air, the other of the first module and the second module performs desorption of the adsorbed moisture. The air handling unit having the aforementioned configuration uses the heat exchanger coated with the moisture absorbent, and does not use a separate dehumidifying device and a separate humidifying device, and as a result, it is possible to reduce electric power consumption and improve spatial utilization by virtue of a simple structure.

Advantageous Effect(s) of Invention

According to the exemplary embodiment of the present invention, the heat exchanger coated with the moisture absorbent is used, and a separate dehumidifying device and a separate humidifying device are not used, and as a result, it is possible to reduce electric power consumption and improve spatial utilization by virtue of a simple structure.

In addition, according to the exemplary embodiment of the present invention, adsorption and desorption of moisture in air are simultaneously performed, and as a result, it is possible to perform dehumidification and humidification without cessation.

In addition, according to the exemplary embodiment of the present invention, a latent heat load is reduced because dehumidified air flows into a cold water coil at the time of performing the cooling, and deterioration in performance is prevented and costs are reduced because condensate water is not produced and separate piping is not required.

It should be understood that the effects of the present invention are not limited to the aforementioned effects, but include all effects that can be deduced from the configuration of the invention disclosed in the detailed description or claims of the present invention.

DETAILED DESCRIPTION OF THE PREFERRED EMBODIMENTS

Figure 1:
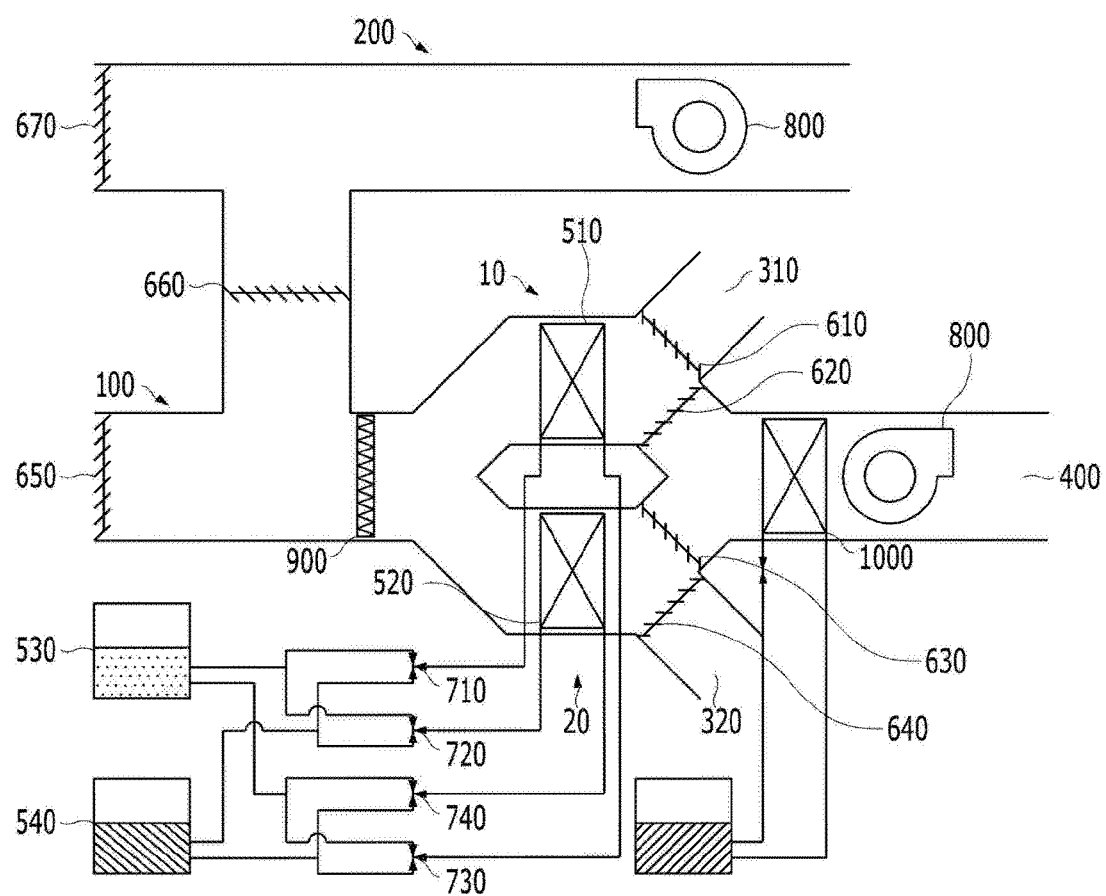
FIG. 1 is a schematic view of an air handling unit with dehumidification and humidification functions according to an exemplary embodiment of the present invention.

To solve the technical problems, an exemplary embodiment of the present invention provides an air handling unit with dehumidification and humidification functions, the air handling unit including: a first module which performs dehumidification or humidification; and a second module which performs dehumidification or humidification alternately with the first module, in which while one of the first module and the second module performs adsorption of moisture in the passing air, the other of the first module and the second module performs desorption of the adsorbed moisture, and the first module and the second module alternately perform the adsorption and the desorption of the moisture in the passing air, respectively.

In the exemplary embodiment of the present invention, the air handling unit with the dehumidification and humidification functions may further include: an outdoor intake port which is connected with the first module and the second module through air flow paths and through which outside air is introduced; a first outdoor outlet port which is connected with and disconnected from the air flow path of the first module and through which air is discharged to the outside of the interior; a second outdoor outlet port which is connected with and disconnected from the air flow path of the second module and through which air is discharged to the outside of the interior; an indoor outlet port which is selectively connected to the first module or the second module and through which air is discharged into the interior; and an indoor intake port which selectively discharges air in the interior to the outside of the interior or to the first module and the second module.

In the exemplary embodiment of the present invention, the air handling unit with the dehumidification and humidification functions may further include: a first of first front flow path in which the outdoor air introduced from the outdoor intake port passes through the first module; a second of first front flow path in which the outdoor air introduced from the outdoor intake port passes through the second module; a first of second front flow path in which the indoor air introduced from the indoor intake port passes through the first module; and a second of second front flow path in which the indoor air introduced from the indoor intake port passes through the second module.

In the exemplary embodiment of the present invention, the air handling unit with the dehumidification and humidification functions may further include: a first of first rear flow path in which the air passing through the first module is discharged to the outside of the interior through the first outdoor outlet port; a second of first rear flow path in which the air passing through the first module is discharged into the interior through the indoor outlet port; a first of second rear flow path in which the air passing through the second module is discharged to the outside of the interior through the second outdoor outlet port; and a second of second rear flow path in which the air passing through the second module is discharged into the interior through the indoor outlet port.

In the exemplary embodiment of the present invention, the air handling unit with the dehumidification and humidification functions may further include: a first separation device which opens or closes the air flow path from the first module to the first outdoor outlet port; a second separation device which opens or closes the air flow path from the first module to the indoor outlet port; a third separation device which opens or closes the air flow path from the second module to the indoor outlet port; and a fourth separation device which opens or closes the air flow path from the second module to the second outdoor outlet port.

In the exemplary embodiment of the present invention, the air handling unit with the dehumidification and humidification functions may further include: a fifth separation device which allows or blocks a flow of air into the outdoor intake port from the outside of the interior; a sixth separation device which opens or closes the air flow path from the indoor intake port to the first module and the second module; and a seventh separation device which allows or blocks a discharge of air from the indoor intake port to the outside of the interior.

In the exemplary embodiment of the present invention, the first module may include a first heat exchanger having a surface coated with a moisture absorbent, and the second module may include a second heat exchanger having a surface coated with a moisture absorbent.

In the exemplary embodiment of the present invention, the first separation device and the second separation device may be configured as one single-blade damper device such that the first of first rear flow path or the second of first rear flow path is selectively formed, and the third separation device and the fourth separation device may be configured as one single-blade damper device such that the first of second rear flow path or the second of second rear flow path is selectively formed.

In the exemplary embodiment of the present invention, the first heat exchanger and the second heat exchanger each may have a function in which an inputted coolant removes heat of adsorption generated due to adsorption while the moisture in the passing air is adsorbed by the moisture absorbent coating the surface, and a function in which inputted hot water heats the moisture absorbent coating while the moisture adsorbed by the moisture absorbent is desorbed.

In the exemplary embodiment of the present invention, the second heat exchanger may heat the moisture absorbent coating while the first heat exchanger dehumidifies the air passing through the first module, and the second heat exchanger may dehumidify the air passing through the second module while the first heat exchanger heats the moisture absorbent coating.

In the exemplary embodiment of the present invention, the air handling unit with the dehumidification and humidification functions may further include: a hot water tank which supplies the hot water to the first heat exchanger and the second heat exchanger and collects the hot water from the first heat exchanger and the second heat exchanger, and a coolant tank which supplies the coolant to the first heat exchanger and the second heat exchanger and collects the coolant from the first heat exchanger and the second heat exchanger.

In the exemplary embodiment of the present invention, the hot water tank and the coolant tank may include: a first valve which is connected with the hot water tank and the coolant tank and supplies the hot water or the coolant to the first heat exchanger; a second valve which is connected with the hot water tank and the coolant tank and supplies the hot water or the coolant to the second heat exchanger; a third valve which is connected with the hot water tank and the coolant tank and collects the hot water or the coolant from the first heat exchanger; and a fourth valve which is connected with the hot water tank and the coolant tank and collects the hot water or the coolant from the second heat exchanger.

In the exemplary embodiment of the present invention, the air handling unit with the dehumidification and humidification functions may further include: a filter which is provided in the air flow path formed from the outdoor intake port or the indoor intake port to the first module or the second module so as to purify the air.

In the exemplary embodiment of the present invention, the indoor outlet port may include a cold water coil which cools the air dehumidified by the first heat exchanger or the second heat exchanger.

In the exemplary embodiment of the present invention, the air handling unit with the dehumidification and humidification functions may further include: the first of second front flow path, the second of second front flow path, the second of first rear flow path, and the second of second rear flow path include air blowers which increase a flow velocity and a flow amount of air by using a pressure difference between an intake side and a discharge side.

In the exemplary embodiment of the present invention, the air handling unit with the dehumidification and humidification functions may further include: a control unit which controls the first heat exchanger and the second heat exchanger so that adsorption and desorption of moisture are alternately performed by the first heat exchanger and the second heat exchanger, and controls the first separation device to the fourth separation device so as to form the air flow paths.

To solve the technical problems, another exemplary embodiment the present invention provides a ventilation type dehumidifying and cooling method including: step (a) in which the first of first front flow path and the first of first rear flow path are formed with respect to the first module, the hot water is inputted to the first heat exchanger, and simultaneously, the second of first front flow path and the second of second rear flow path are formed with respect to the second module, and the coolant is inputted to the second heat exchanger; step (b) in which the adsorbed moisture is desorbed from the heated moisture absorbent of the first heat exchanger, the air introduced into the first of first front flow path discharges the moisture to the first of first rear flow path, and simultaneously, the moisture in the air introduced into the second of first front flow path is adsorbed by the moisture absorbent of the second heat exchanger, and the dehumidified air flow to the second of second rear flow path and is cooled by a cold water coil and discharged; step (c) in which the air introduced into the indoor intake port from the interior is discharged to the outside of the interior; step (d) in which the first of first front flow path and the second of first rear flow path are formed with respect to the first module, the coolant is inputted to the first heat exchanger, and simultaneously, the second of first front flow path and the first of second rear flow path are formed with respect to the second module, and the hot water is inputted to the second heat exchanger; step (e) in which the moisture of the air introduced into the first of first front flow path is adsorbed by the moisture absorbent of the first heat exchanger, the dehumidified air flows to the second of first rear flow path and is cooled by a cold water coil and discharged, and simultaneously, the adsorbed moisture is desorbed from the heated moisture absorbent of the second heat exchanger, and the air introduced into the second of first front flow path discharges the moisture to the first of second rear flow path; and step (f) in which the air introduced into the indoor intake port from the interior is discharged to the outside of the interior; in which step (a) to step (f) are sequentially and repeatedly performed.

To solve the technical problems, still another exemplary embodiment the present invention provides an indoor circulation type dehumidifying and cooling method including: step (a) in which the first of second front flow path and the first of first rear flow path are formed with respect to the first module, the hot water is inputted to the first heat exchanger, and simultaneously, the second of second front flow path and the second of second rear flow path are formed with respect to the second module, and the coolant is inputted to the second heat exchanger; step (b) in which the adsorbed moisture is desorbed from the heated moisture absorbent of the first heat exchanger, the air introduced into the first of second front flow path discharges the moisture to the first of first rear flow path, and simultaneously, the moisture in the air introduced into the second of second front flow path is adsorbed by the moisture absorbent of the second heat exchanger, and the dehumidified air flows to the second of second rear flow path and is cooled by a cold water coil and discharged; step (c) in which the air introduced into the indoor intake port from the interior flows back to the first of second front flow path and the second of second front flow path; step (d) in which the first of second front flow path and the second of first rear flow path are formed with respect to the first module, the coolant is inputted to the first heat exchanger, and simultaneously, the second of second front flow path and the first of second rear flow path are formed with respect to the second module, and the hot water is inputted to the second heat exchanger; step (e) in which the moisture in the air introduced into the first of second front flow path is adsorbed by the moisture absorbent of the first heat exchanger, the dehumidified air flows to the second of first rear flow path and is cooled by the cold water coil and discharged, and simultaneously, the adsorbed moisture is desorbed from the heated moisture absorbent of the second heat exchanger, and the air introduced into the second of second front flow path discharges the moisture to the first of second rear flow path; and step (f) in which the air introduced into the indoor intake port from the interior flows back to the first of second front flow path and the second of second front flow path, in which step (a) to step (f) are sequentially and repeatedly performed.

To solve the technical problems, yet another exemplary embodiment the present invention provides a ventilation type humidifying and heating method including: step (a) in which the first of first front flow path and the first of first rear flow path are formed with respect to the first module, the coolant is inputted to the first heat exchanger, and simultaneously, the second of first front flow path and the second of second rear flow path are formed with respect to the second module, and the hot water is inputted to the second heat exchanger; step (b) the moisture in the air introduced into the first of first front flow path is adsorbed by the moisture absorbent of the first heat exchanger, the air from which the moisture has been removed is discharged to the first of first rear flow path, and simultaneously, the air introduced into the second of first front flow path is heated by the second heat exchanger, the air is humidified by the moisture desorbed from the heated moisture absorbent of the second heat exchanger, and the air is discharged to the second of second rear flow path; step (c) in which the air introduced into the indoor intake port from the interior is discharged to the outside of the interior; step (d) in which the first of first front flow path and the second of first rear flow path are formed with respect to the first module, the hot water is inputted to the first heat exchanger, and simultaneously, the second of first front flow path and the first of second rear flow path are formed with respect to the second module, and the coolant is inputted to the second heat exchanger; step (e) in which the air introduced into the first of first front flow path is heated by the first heat exchanger, the air is humidified by the moisture desorbed from the heated moisture absorbent of the first heat exchanger, the air is discharged to the second of first rear flow path, and simultaneously, the moisture in the air introduced into the second of first front flow path is adsorbed by the moisture absorbent of the second heat exchanger, and the air from which the moisture has been removed is discharged to the first of second rear flow path; and step (f) in which the air introduced into the indoor intake port from the interior is discharged to the outside of the interior; in which step (a) to step (f) are sequentially and repeatedly performed.

To solve the technical problems, still yet another exemplary embodiment the present invention provides an indoor circulation type humidifying and heating method including: step (a) in which the first of second front flow path and the first of first rear flow path are formed with respect to the first module, the coolant is inputted to the first heat exchanger, and simultaneously, the second of second front flow path and the second of second rear flow path are formed with respect to the second module, and the hot water is inputted to the second heat exchanger; step (b) in which the moisture in the air introduced into the first of second front flow path is adsorbed by the moisture absorbent of the first heat exchanger, the air from which the moisture has been removed is discharged to the first of first rear flow path, and simultaneously, the air introduced into the second of second front flow path is heated by the second heat exchanger, the air is humidified by the moisture desorbed from the heated moisture absorbent of the second heat exchanger, and the air is discharged to the second of second rear flow path; step (c) in which the air introduced into the indoor intake port from the interior flows back to the first of second front flow path and the second of second front flow path; step (d) in which the first of second front flow path and the second of first rear flow path are formed with respect to the first module, the hot water is inputted to the first heat exchanger, and simultaneously, the second of second front flow path and the first of second rear flow path are formed with respect to the second module, and the coolant is inputted to the second heat exchanger; step (e) in which the air introduced into the first of second front flow path is heated by the first heat exchanger, the air is humidified by the moisture desorbed from the heated moisture absorbent of the first heat exchanger, the air is discharged to the second of first rear flow path, and simultaneously, the moisture in the air introduced into the second of second front flow path is adsorbed by the moisture absorbent of the second heat exchanger, and the air from which the moisture has been removed is discharged to the first of second rear flow path; and step (f) in which the air introduced into the indoor intake port from the interior flows back to the first of second front flow path and the second of second front flow path, in which step (a) to step (f) are sequentially and repeatedly performed.

Embodiment(s)

Hereinafter, the present invention will be described with reference to the accompanying drawings. However, the present invention may be implemented in various different ways, and is not limited to the exemplary embodiment described herein. The drawings and description are to be regarded as illustrative in nature and not restrictive. Similar reference numerals designate similar elements throughout the specification.

Throughout this specification and the claims, when one constituent element is referred to as being "connected to (engaged with, in contact with, or coupled to)" another constituent element, one constituent element can be "directly connected" to the other constituent element, and one constituent element can also be "indirectly connected to" the other constituent element with other constituent elements disposed therebetween. In addition, unless otherwise described, the word "comprise" and variations such as "comprises" or "comprising" will be understood to imply the inclusion of stated elements, not the exclusion of any other elements.

Terms used in the present specification are used only to describe specific exemplary embodiments, and are not intended to limit the present invention. Singular expressions used herein include plurals expressions unless they have definitely opposite meanings in the context. In the present specification, it will be appreciated that terms "including" and "having" are intended to designate the existence of characteristics, numbers, steps, operations, constituent elements, and components described in the specification or a combination thereof, and do not exclude a possibility of the existence or addition of one or more other characteristics, numbers, steps, operations, constituent elements, and components, or a combination thereof in advance.

Hereinafter, an exemplary embodiment of the present invention will be described in detail with reference to the accompanying drawings.

Hereinafter, it is noted that a coolant serves to remove heat generated by a moisture absorbent, and cold water flows into a cold water coil 1000 and serves to cool air passing over the cold water coil 1000, such that the coolant and the cold water are elements distinguished from each other.

FIG. 1 is a schematic view of an air handling unit with dehumidification and humidification functions according to an exemplary embodiment of the present invention.

As illustrated in FIG. 1, the air handling unit with the dehumidification and humidification functions may include a first module 10 which performs dehumidification or humidification, and a second module 20 which performs dehumidification or humidification alternately with the first module 10, and while one of the first module 10 and the second module 20 adsorbs moisture in passing air, the other of the first module 10 and the second module 20 may desorb the absorbed moisture.

The first module 10 and the second module 20 may alternately perform adsorption and desorption of moisture including the air that passes through the first module 10 and the second module 20, respectively.

Therefore, the first module 10 and the second module 20 may be controlled by a single system.

The air handling unit with the dehumidification and humidification functions may further include an outdoor intake port 100 which may be connected with the first module 10 and the second module 20 through air flow paths and through which outside air is introduced, a first outdoor outlet port 310 which may be connected with and disconnected from the air flow path of the first module 10 and through which air is discharged to the outside of the interior, a second outdoor outlet port 320 which may be connected with and disconnected from the air flow path of the second module 20 and through which air is discharged to the outside of the interior, an indoor outlet port which is selectively connected to the first module 10 or the second module 20 and through which air is discharged into the interior, and an indoor intake port 200 which selectively discharges air in the interior to the outside of the interior, or to the first module 10 and the second module 20.

The air handling unit with the dehumidification and humidification functions may further include a first of first front flow path 1110 in which the outdoor air introduced from the outdoor intake port 100 passes through the first module 10, a second of first front flow path 1120 in which the outdoor air introduced from the outdoor intake port 100 passes through the second module 20, a first of second front flow path 1210 in which the indoor air introduced from the indoor intake port 200 passes through the first module 10, and a second of second front flow path 1220 in which the indoor air introduced from the indoor intake port 200 passes through the second module 20.

The air handling unit with the dehumidification and humidification functions may further include a first of first rear flow path 2110 in which the air passing through the first module 10 is discharged to the outside of the interior through the first outdoor outlet port 310, a second of first rear flow path 2120 in which the air passing through the first module 10 is discharged into the interior through the indoor outlet port 400, a first of second rear flow path 2210 in which the air passing through the second module 20 is discharged to the outside of the interior through the second outdoor outlet port 320, and a second of second rear flow path 2220 in which the air passing through the second module 20 is discharged into the interior through the indoor outlet port 400.

The air handling unit with the dehumidification and humidification functions may further include a first separation device 610 which opens or closes the air flow path from the first module 10 to the first outdoor outlet port 310, a second separation device 620 which opens or closes the air flow path from the first module 10 to the indoor outlet port, a third separation device 630 which opens or closes the air flow path from the second module 20 to the indoor outlet port 400, and a fourth separation device 640 which opens or closes the air flow path from the second module 20 to the second outdoor outlet port 320.

The air handling unit with the dehumidification and humidification functions may further include a fifth separation device 650 which allows or blocks a flow of air into the outdoor intake port 100 from the outside of the interior, a sixth separation device 660 which opens or closes the air flow path from the indoor intake port 200 to the first module 10 and the second module 20, and a seventh separation device 670 which allows or blocks a discharge of air from the indoor intake port 200 to the outside of the interior.

The first separation device 610, the second separation device 620, the third separation device 630, and the fourth separation device 640 may be configured as dampers, respectively.

In addition, the fifth separation device 650, the sixth separation device 660, and the seventh separation device 670 may be configured as dampers, respectively.

In the exemplary embodiment of the present invention, the respective separation devices are described as being configured as dampers, respectively, but the present invention is not necessarily limited thereto. A shutter, a shutter grill, or the like, which may open and close the air flow path, may be used.

The first module 10 may include a first heat exchanger 510 having a surface coated with the moisture absorbent, and the second module 20 may include a second heat exchanger 520 having a surface coated with the moisture absorbent.

The first heat exchanger 510 and the second heat exchanger 520 each may have a function in which the inputted coolant removes heat of adsorption generated due to adsorption while the moisture in the passing air is adsorbed by the moisture absorbent coating the surface, and a function in which the inputted hot water heats the moisture absorbent coating while the moisture adsorbed by the moisture absorbent is desorbed.

Heat may be generated during a process in which the moisture absorbent adsorbs moisture, and the resulting heat of adsorption may be removed by inputting the coolant to the respective heat exchangers, and as a result, it is possible to maximize efficiency of dehumidification.

The moisture absorbent may have the nature of adsorbing moisture at a low temperature, and the nature of desorbing moisture at a high temperature because of an increase in kinetic energy of the moisture.

The performance required for the moisture absorbent may be high hygroscopicity and a low regeneration temperature.

The high hygroscopicity is advantageous because regeneration/dehumidification cycle periods may be prolonged, and the low regeneration temperature has an advantage in that a configuration of a part for heating the moisture absorbent may be simplified.

As the moisture absorbent, zeolite, silica gel, and alumina may be adopted, but the present invention is not limited thereto, and particularly, the zeolite or the silica gel is adopted.

The silica gel refers to solidified amorphous grains which have a network structure in which small holes are connected one another, and water, which is a solvent, is put into therebetween, and the silica gel has excellent performance in absorbing moisture because of a large surface area.

The zeolite collectively refers to a mineral which is an aluminum silicate hydrate of alkali and alkaline earth metal, and the bonding of atoms is loose because of a crystal structure, and thus a coupling structure is maintained even though the moisture between the atoms is discharged by high heat, and the zeolite has the property capable of adsorbing moisture and particulate matters.

Further, the heat exchanger may be coated with the moisture absorbent through a process in which the heat exchanger is immersed into a moisture absorbent liquid by a dip coating method, and then the heat exchanger is dried and then fired under a condition of 200-500° C., but the present invention is not necessarily limited to this method.

The second heat exchanger 520 may heat the moisture absorbent coating while the first heat exchanger 510 dehumidifies the air passing through the first module 10, and the second heat exchanger 520 may dehumidifies the air passing through the second module 20 while the first heat exchanger 510 heats the moisture absorbent coating the first module 10.

When the inflow air passes over the periphery of the heated moisture absorbent, the air is heated, and as a result, it is possible to heat the interior.

The air handling unit with the dehumidification and humidification functions may further include a hot water tank 530 which supplies the hot water to the first heat exchanger 510 and the second heat exchanger 520 and collects the hot water from the first heat exchanger 510 and the second heat exchanger 520, and a coolant tank 540 which supplies the coolant to the first heat exchanger 510 and the second heat exchanger 520 and collects the coolant from the first heat exchanger 510 and the second heat exchanger 520.

The hot water tank 530 may store the hot water produced by a device such as a boiler, and may be configured integrally with a heat generating device so as to supply the hot water.

The coolant tank 540 may store the coolant produced by a cooling device or the like, and may be configured integrally with the cooling device so as to supply the coolant.

The hot water tank 530 and the coolant tank 540 may include a first valve 710 which is connected with the hot water tank 530 and the coolant tank 540 and supplies the hot water or the coolant to the first heat exchanger 510, a second valve 720 which is connected with the hot water tank 530 and the coolant tank 540 and supplies the hot water or the coolant to the second heat exchanger 520, a third valve 730 which is connected with the hot water tank 530 and the coolant tank 540 and collects the hot water or the coolant from the first heat exchanger 510, and a fourth valve 740 which is connected with the hot water tank 530 and the coolant tank 540 and collects the hot water or the coolant from the second heat exchanger 520.

The first valve 710, the second valve 720, the third valve 730, and the fourth valve 740 may be configured as three-way valves, respectively.

In the exemplary embodiment of the present invention, the respective valves are described as being configured as three-way valves, respectively, but the present invention is not necessarily limited thereto.

The air handling unit with the dehumidification and humidification functions may further include a filter 900 which is provided in the air flow path formed from the outdoor intake port 100 or the indoor intake port 200 to the first module 10 or the second module 20 so as to purify the air.

In the exemplary embodiment of the present invention, the filter 900 is described as being provided in the air flow path formed from the outdoor intake port 100 or the indoor intake port 200 to the first module 10 or the second module 20, but the present invention is not necessarily limited thereto. The filter 900 may be positioned at a position, where the filter 900 may purify the air, of the first of first front flow path 1110, the second of first front flow path 1120, the first of second front flow path 1210, the second of second front flow path 1220, the first of first rear flow path 2110, the second of first rear flow path 2120, the first of second rear flow path 2210, and the second of second rear flow path 2220.

The indoor outlet port 400 may include a cold water coil 1000 which cools the air dehumidified by the first heat exchanger 510 or the second heat exchanger 520.

A separate tank, which supplies the cold water, may be provided at the cold water coil 1000. The tank, which supplies the cold water to the cold water coil 1000, may store the cold water produced by a cooling device or the like, and may be configured integrally with the cooling device so as to supply the cold water.

The cold water coil 1000 may be operated only in a dehumidifying and cooling mode, and may not be operated in a humidifying and heating mode. The cold water coil 1000 may be substituted with an evaporator or the like.

In a case in which the air is cooled in the cold water coil 1000, the dehumidification is performed before the moisture in the air reaches the cold water coil 1000, and as a result, because no latent heat load is generated, it is possible to prevent a decrease in performance of the cold water coil 1000, and because no condensate water is produced, separate piping for draining the condensate water is not required, and as a result, it is possible to reduce costs.

The first of second front flow path 1210, the second of second front flow path 1220, the second of first rear flow path 2120, and the second of second rear flow path may include air blowers 800, respectively, which increase a flow velocity and a flow amount of air by using a pressure difference between an intake side and a discharge side.

The air blower 800 included in the first of second front flow path 1210 and the second of second front flow path 1220 may be positioned in the indoor intake port 200, and the air blower 800 may increase a flow velocity and a flow amount of the air which is introduced from the interior and discharged to the outside of the interior.

The air handling unit with the dehumidification and humidification functions may further include a control unit which controls the first heat exchanger 510 and the second heat exchanger 520 so that adsorption and desorption of moisture are alternately performed by the first heat exchanger 510 and the second heat exchanger 520, and controls the first separation device 610 to the fourth separation device 640 so as to form the air flow paths. Further, the control unit may control the fifth separation device to the seventh separation device.

In addition, the control unit controls the hot water and the coolant so that the hot water and the coolant are selectively inputted to and discharged from the first heat exchanger 510 and the second heat exchanger 520, thereby performing the cooling when the dehumidification is performed such that the moisture is adsorbed, and performing the heating when the humidification is performed such that the moisture is desorbed.

Further, the control unit may be connected with sensors of the respective constituent elements, and may automatically control humidity, a temperature, and the like which are required in the interior at the time of the dehumidification and cooling or at the time of the humidification and heating.

The control unit may be an embedded system equipped with a processor core such as a microcontroller or a DSP. Therefore, the dehumidification and cooling or the humidification and heating is consistently optimized, and as a result, it is possible to improve reliability and performance. Alternatively, the control unit may uses firmware which is software embedded in a ROM or a flash memory of a particular hardware device. However, the configuration of the control unit is not necessarily limited to the aforementioned configuration.

Figure 2:
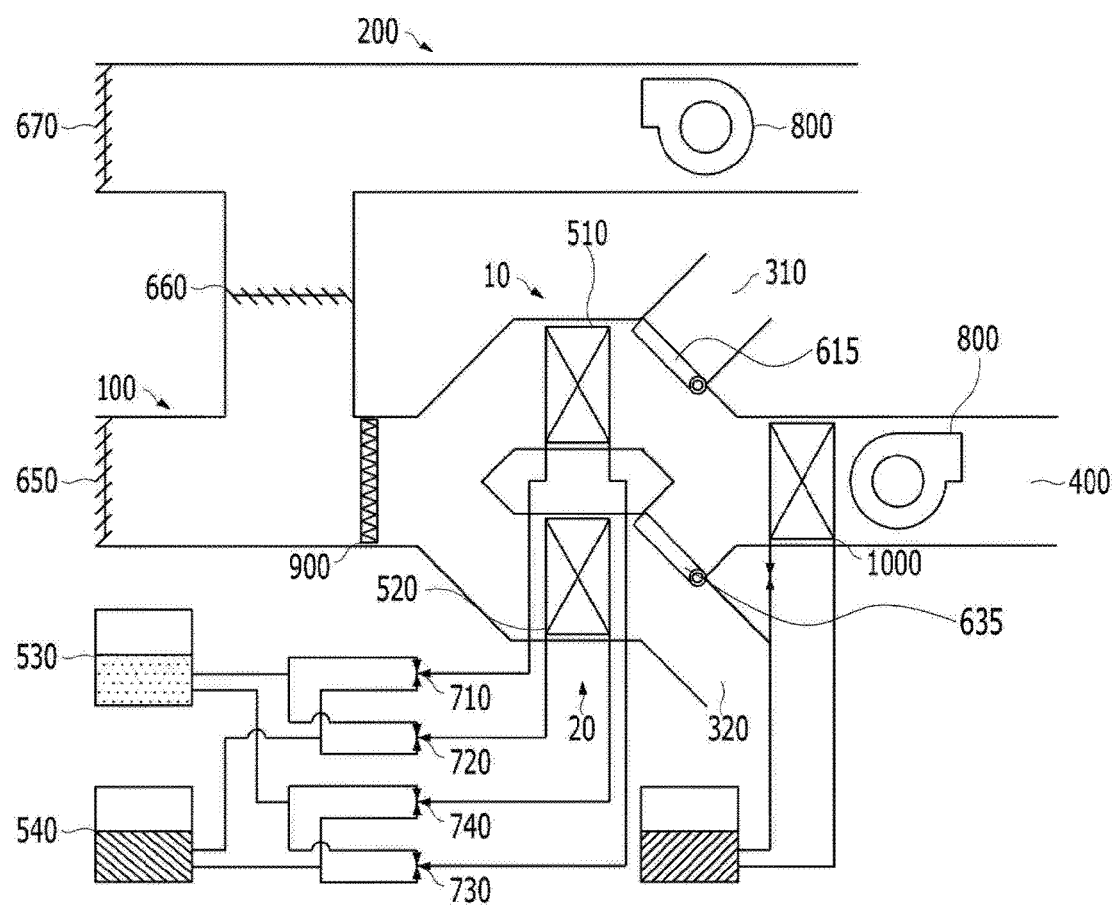
FIG. 2 is a schematic view of the air handling unit with the dehumidification and humidification functions according to the exemplary embodiment of the present invention in which a single-blade damper for a first of first rear flow path and a second of first rear flow path and a single-blade damper for a first of second rear flow path and a second of second rear flow path are installed.

FIG. 2 is a schematic view of the air handling unit with the dehumidification and humidification functions according to the exemplary embodiment of the present invention in which a single-blade damper 615 for the first of first rear flow path and the second of first rear flow path and a single-blade damper 635 for the first of second rear flow path and the second of second rear flow path are installed.

As illustrated in FIG. 2, the first separation device 610 and the second separation device 620 may be configured as one single-blade damper device such that the first of first rear flow path 2110 or the second of first rear flow path 2120 is selectively formed, and the third separation device 630 and the fourth separation device 640 may be configured as one single-blade damper device such that the first of second rear flow path 2210 or the second of second rear flow path 2220 are selectively formed.

The second of first rear flow path 2120 is formed when the single-blade damper 615 for the first of first rear flow path and the second of first rear flow path closes the first outdoor outlet port 310, and the first of first rear flow path 2110 is formed when the single-blade damper 615 closes the flow path from the first heat exchanger 510 to the indoor outlet port 400.

The second of second rear flow path 2220 is formed when the single-blade damper 635 for the first of second rear flow path and the second of second rear flow path closes the second outdoor outlet port 320, and the first of second rear flow path 2210 is formed when the single-blade damper 635 closes the flow path from the second heat exchanger 520 to the indoor outlet port.

Hereinafter, a dehumidifying and cooling method and a humidifying and heating method using the air handling unit with the dehumidification and humidification functions will be described.

The respective separation devices are variably opened or closed to control the air flow paths when the front flow path and the rear flow path are formed, and hereinafter, in a case in which the front flow path and the rear flow path are formed, this means that the respective separation devices are opened or closed in advance without a separate description thereof.

Figure 3:
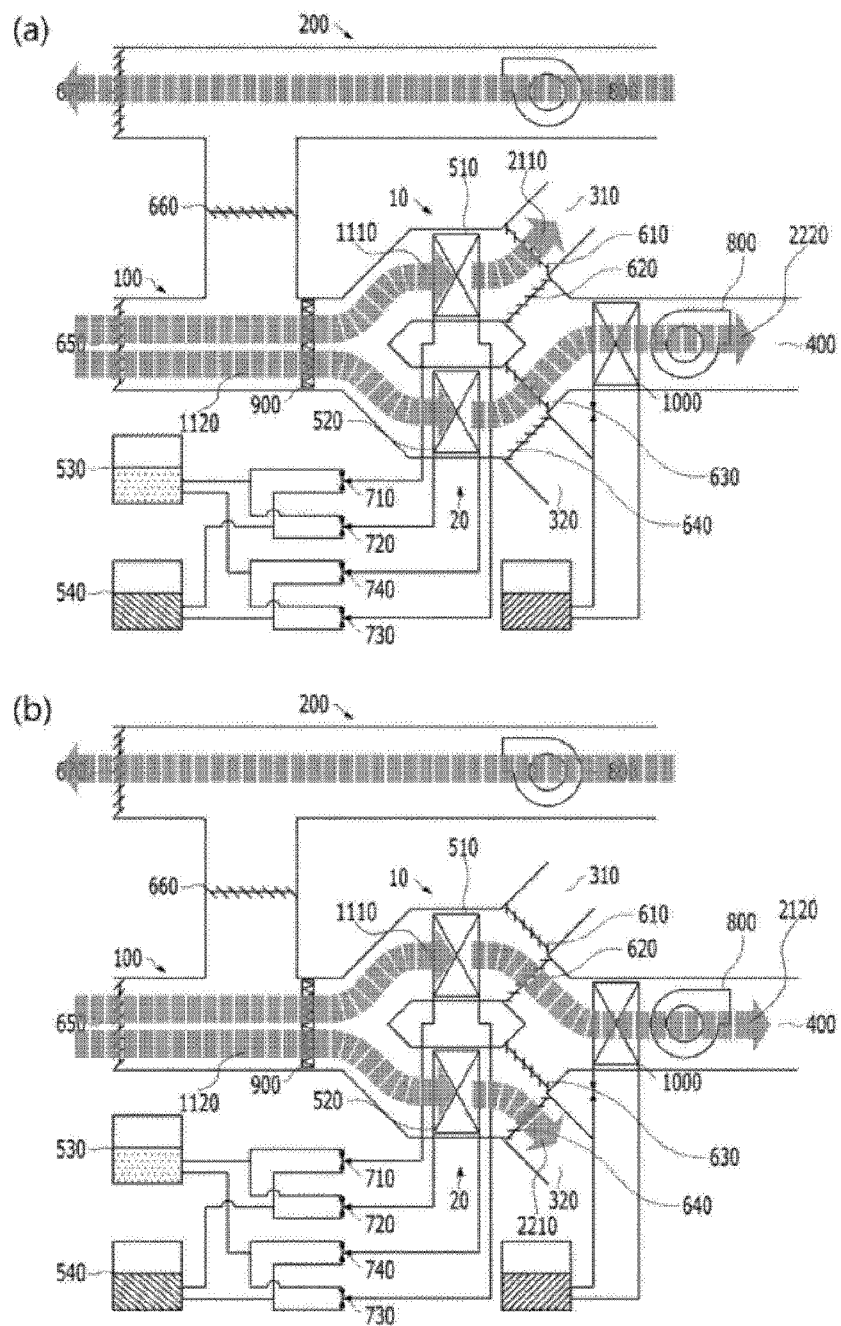
FIG. 3 is a schematic view of an air flow path of a ventilation type dehumidifying and cooling method according to the exemplary embodiment of the present invention.

FIG. 3 is a schematic view of an air flow path of a ventilation type dehumidifying and cooling method according to the exemplary embodiment of the present invention.

First, as illustrated in FIG. 3A, the first of first front flow path 1110 and the first of first rear flow path 2110 may be formed with respect to the first module 10, the hot water may be inputted to the first heat exchanger 510, and simultaneously, the second of first front flow path 1120 and the second of second rear flow path 2220 may be formed with respect to the second module 20, and the coolant may be inputted to the second heat exchanger 520.

Second, the adsorbed moisture may be desorbed from the heated moisture absorbent of the first heat exchanger 510, the air introduced into the first of first front flow path 1110 may discharge the moisture to the first of first rear flow path 2110, and simultaneously, the moisture in the air introduced into the second of first front flow path 1120 may be adsorbed by the moisture absorbent of the second heat exchanger 520, and the dehumidified air may flow to the second of second rear flow path 2220 and may be cooled by the cold water coil 1000 and then discharged [see FIG. 3A].

Third, the air introduced into the indoor intake port 200 from the interior may be discharged to the outside of the interior [see FIG. 3A].

Fourth, as illustrated in FIG. 3B, the first of first front flow path 1110 and the second of first rear flow path 2120 may be formed with respect to the first module 10, the coolant may be inputted to the first heat exchanger 510, and simultaneously, the second of first front flow path 1120 and the first of second rear flow path 2210 may be formed with respect to the second module 20, and the hot water may be inputted to the second heat exchanger 520.

Fifth, the moisture in the air introduced into the first of first front flow path 1110 may be adsorbed by the moisture absorbent of the first heat exchanger 510, the dehumidified air may flow to the second of first rear flow path 2120 and may be cooled by the cold water coil 1000 and then discharged, and simultaneously, the adsorbed moisture may be desorbed from the heated moisture absorbent of the second heat exchanger 520, and the air introduced into the second of first front flow path 1120 may discharge the moisture to the first of second rear flow path 2210 [see FIG. 3B]

Sixth, the air introduced into the indoor intake port 200 from the interior may be discharged to the outside of the interior [see FIG. 3B]

The respective steps may be sequentially and repeatedly performed.

Figure 4:
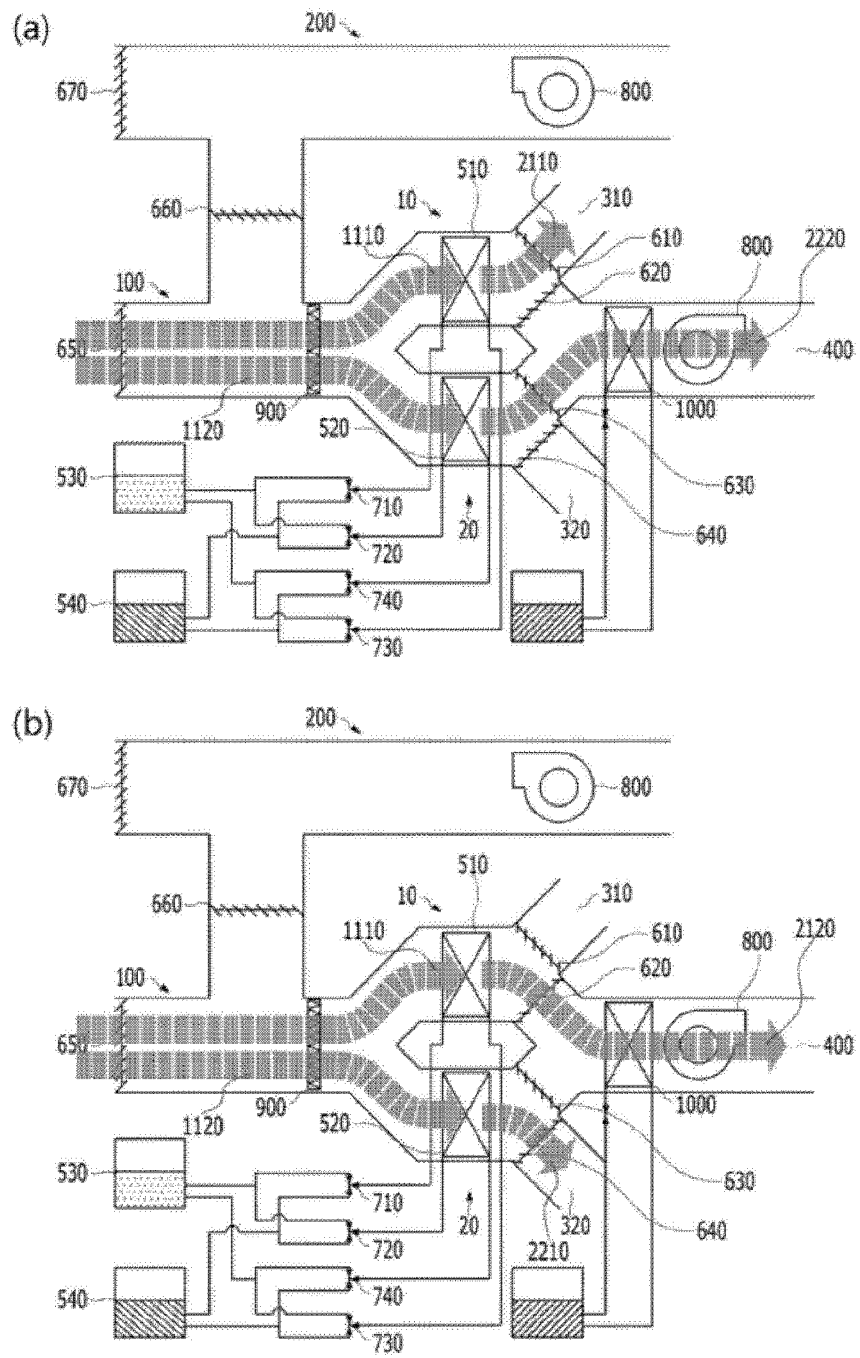
FIG. 4 is a schematic view of an air flow path of an outside air introduction type dehumidifying and cooling method according to the exemplary embodiment of the present invention.

FIG. 4 is a schematic view of an air flow path of an outside air introduction type dehumidifying and cooling method according to the exemplary embodiment of the present invention.

As illustrated in FIG. 4, the third and sixth steps in the ventilation type dehumidifying and cooling method, in which the air introduced into the indoor intake port 200 from the interior is discharged to the outside of the interior, are excluded, and as a result, the outside air introduction type dehumidifying and cooling method may be performed in which if the air is not discharged from the interior to the outside of the interior, the outdoor air is dehumidified and cooled and flows only into the interior.

The outside air introduction type dehumidifying and cooling method may be used when the air in the interior is discharged to other flow paths directed toward a window or the like in a building instead of being discharged to the indoor intake port 200.

When one heat exchanger performs the adsorption of the moisture, the other heat exchanger simultaneously performs the desorption of the moisture, and there may be an intermediate step in which the coolant is discharged and the hot water is inputted, or the hot water is discharged and the coolant is inputted. At the time of performing the cooling, the hot water is inputted to one heat exchanger such that the moisture is desorbed, the hot water is then discharged, the coolant is inputted such that the dehumidification and cooling is enabled, and then the air flow path may be changed. However, because this step is the intermediate step that is performed while the dehumidification and cooling is consistently performed by the other heat exchanger, the effect of the present invention, which continuously performs the dehumidification and cooling, may be maintained. This method is also the same as the following dehumidifying and cooling method.

Figure 5:
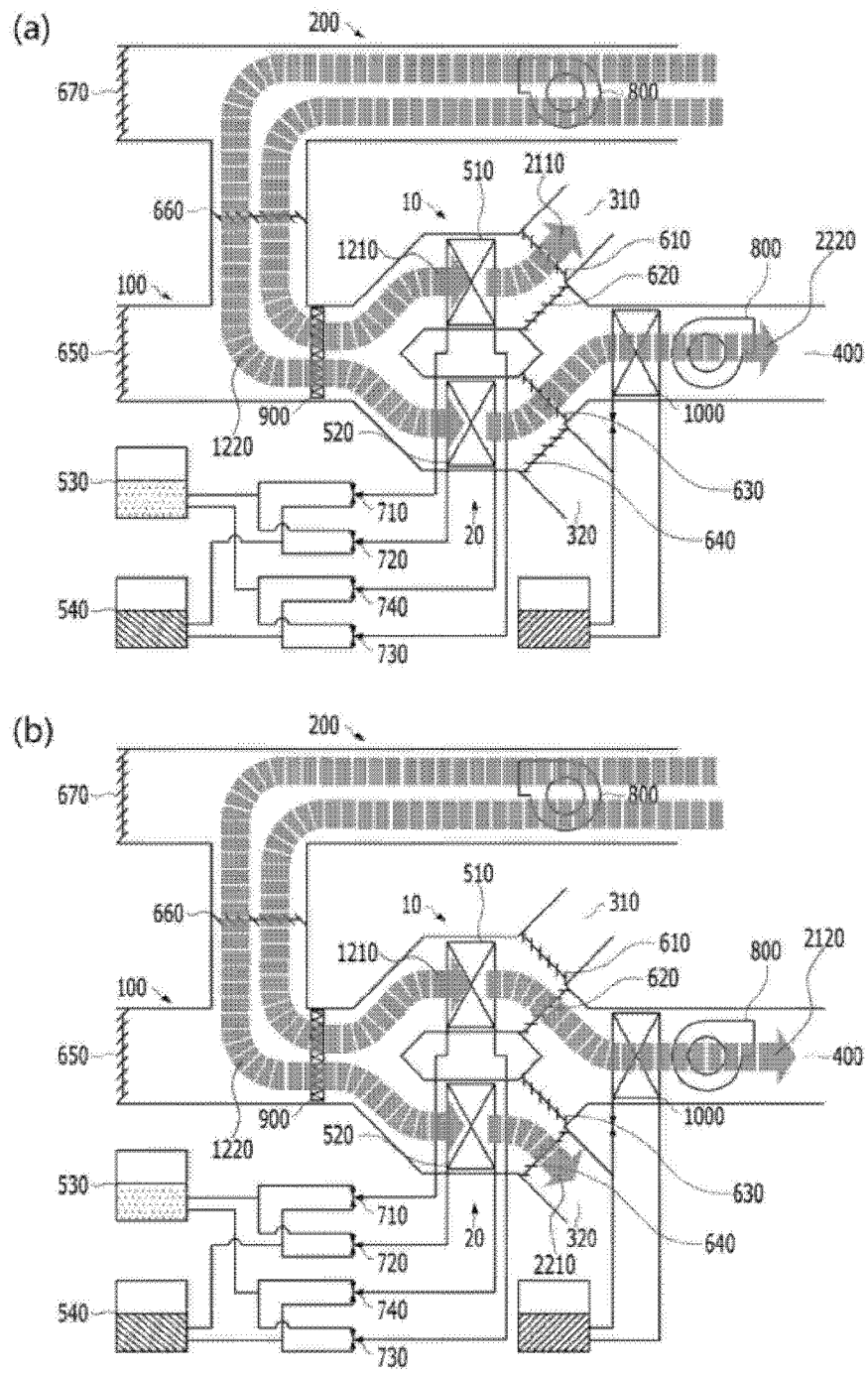
FIG. 5 is a schematic view of an air flow path of an indoor circulation type dehumidifying and cooling method according to the exemplary embodiment of the present invention.

FIG. 5 is a schematic view of an air flow path of an indoor circulation type dehumidifying and cooling method according to the exemplary embodiment of the present invention.

First, as illustrated in FIG. 5A, the first of second front flow path 1210 and the first of first rear flow path 2110 may be formed with respect to the first module 10, the hot water may be inputted to the first heat exchanger 510, and simultaneously, the second of second front flow path 1220 and the second of second rear flow path 2220 may be formed with respect to the second module 20, and the coolant may be inputted to the second heat exchanger 520.

Second, the adsorbed moisture may be desorbed from the heated moisture absorbent of the first heat exchanger 510, the air introduced into the first of second front flow path 1210 may discharge the moisture to the first of first rear flow path 2110, and simultaneously, the moisture in the air introduced into the second of second front flow path 1220 may be adsorbed by the moisture absorbent of the second heat exchanger 520, the dehumidified air may flow to the second of second rear flow path 2220 and may be cooled by the cold water coil 1000 and then discharged [see FIG. 5A].

Third, the air introduced into the indoor intake port 200 from the interior may flow back to the first of second front flow path 1210 and the second of second front flow path 1220 [see FIG. 5A]

Fourth, as illustrated in FIG. 5B, the first of second front flow path 1210 and the second of first rear flow path 2120 may be formed with respect to the first module 10, the coolant may be inputted to the first heat exchanger 510, and simultaneously, the second of second front flow path 1220 and the first of second rear flow path 2210 may be formed with respect to the second module 20, and the hot water may be inputted to the second heat exchanger 520.

Fifth, the moisture in the air introduced into the first of second front flow path 1210 may be adsorbed by the moisture absorbent of the first heat exchanger 510, the dehumidified air may flow to the second of first rear flow path 2120 and may be cooled by the cold water coil 1000 and then discharged, and simultaneously, the adsorbed moisture may be desorbed from the heated moisture absorbent of the second heat exchanger 520, and the air introduced into the second of second front flow path 1220 may discharge the moisture to the first of second rear flow path 2210 [see FIG. 5B].

Sixth, the air introduced into the indoor intake port 200 from the interior may flow back to the first of second front flow path 1210 and the second of second front flow path 1220 [see FIG. 5B].

The respective steps may be sequentially and repeatedly performed.

Figure 6:
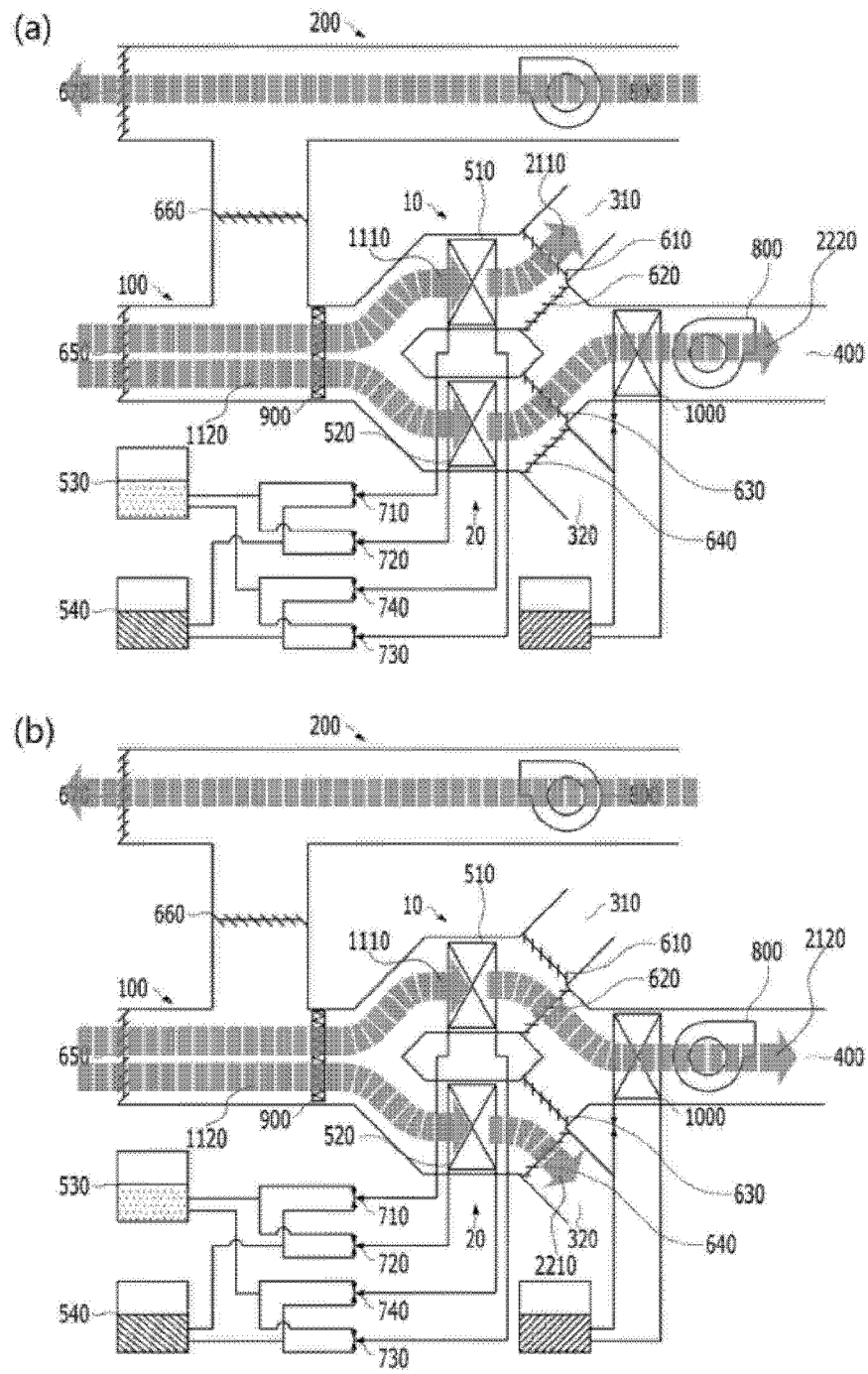
FIG. 6 is a schematic view of an air flow path of a ventilation type humidifying and heating method according to the exemplary embodiment of the present invention.

FIG. 6 is a schematic view of an air flow path of a ventilation type humidifying and heating method according to the exemplary embodiment of the present invention.

First, as illustrated in FIG. 6A, the first of first front flow path 1110 and the first of first rear flow path 2110 may be formed with respect to the first module 10, the coolant may be inputted to the first heat exchanger 510, and simultaneously, the second of first front flow path 1120 and the second of second rear flow path 2220 may be formed with respect to the second module 20, and the hot water may be inputted to the second heat exchanger 520.

Second, the moisture in the air introduced into the first of first front flow path 1110 may be adsorbed by the moisture absorbent of the first heat exchanger 510, the air from which the moisture has been removed may be discharged to the first of first rear flow path 2110, and simultaneously, the air introduced into the second of first front flow path 1120 may be heated by the second heat exchanger 520, the air may be humidified by the moisture desorbed from the heated moisture absorbent of the second heat exchanger 520, and the air may be discharged to the second of second rear flow path [see FIG. 6A].

Third, the air introduced into the indoor intake port 200 from the interior may be discharged to the outside of the interior [see FIG. 6A].

Fourth, as illustrated in FIG. 6B, the first of first front flow path 1110 and the second of first rear flow path 2120 may be formed with respect to the first module 10, the hot water may be inputted to the first heat exchanger 510, and simultaneously, the second of first front flow path 1120 and the first of second rear flow path 2210 may be formed with respect to the second module 20, and the coolant may be inputted to the second heat exchanger 520.

Fifth, the air introduced into the first of first front flow path 1110 may be heated by the first heat exchanger 510, the air may be humidified by the moisture desorbed from the heated moisture absorbent of the first heat exchanger 510, and the air may be discharged to the second of first rear flow path, and simultaneously, the moisture in the air introduced into the second of first front flow path 1120 may be adsorbed by the moisture absorbent of the second heat exchanger 520, and the air from which the moisture has been removed may be discharged to the first of second rear flow path 2210 [see FIG. 6B].

Sixth, the air introduced into the indoor intake port 200 from the interior may be discharged to the outside of the interior [see FIG. 6B].

The respective steps may be sequentially and repeatedly performed.

Figure 7:
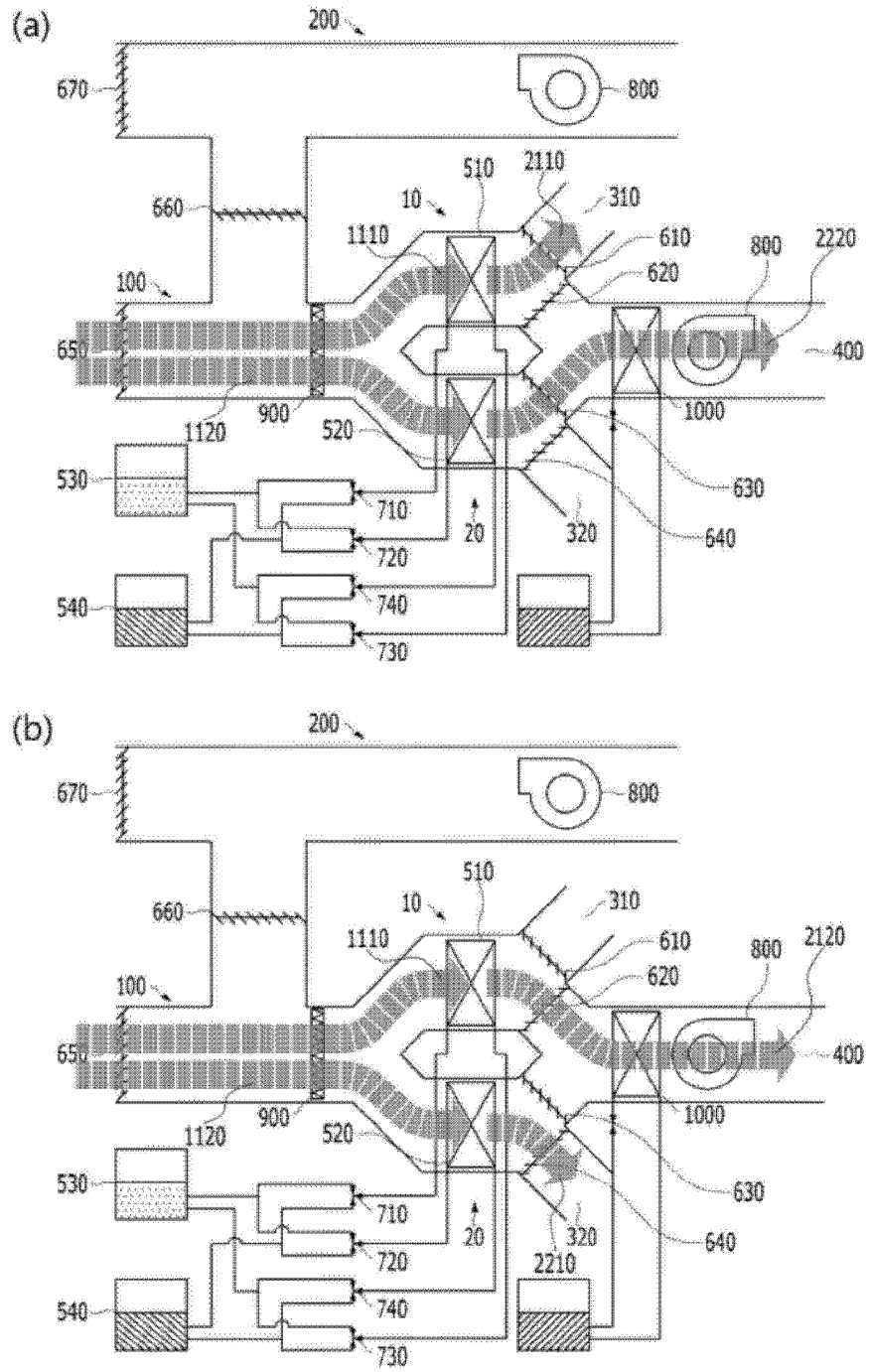
FIG. 7 is a schematic view of an air flow path of an outside air introduction type humidifying and heating method according to the exemplary embodiment of the present invention.

FIG. 7 is a schematic view of an air flow path of an outside air introduction type humidifying and heating method according to the exemplary embodiment of the present invention.

As illustrated in FIG. 7, the third and sixth steps in the ventilation type humidifying and heating method, in which the air introduced into the indoor intake port 200 from the interior is discharged to the outside of the interior, are excluded, and as a result, the outside air introduction type humidifying and heating method may be performed in which if the air is not discharged from the interior to the outside of the interior, the outdoor air is humidified and heated and flows only into the interior.

The outside air introduction type humidifying and heating method may be used when a humidification and heating effect is required within a short period of time at the time of initially performing the humidification and heating.

When one heat exchanger performs the adsorption of the moisture, the other heat exchanger simultaneously performs the desorption of the moisture, and there may be an intermediate step in which the coolant is discharged and the hot water is inputted, or the hot water is discharged and the coolant is inputted. At the time of performing the heating, the coolant is inputted to one heat exchanger such that the moisture is adsorbed, the coolant is then discharged, the hot water is inputted such that the humidification and heating is enabled, and then the air flow path may be changed. However, because this step is the intermediate step that is performed while the humidification and heating is consistently performed by the other heat exchanger, the effect of the present invention, which continuously performs the humidification and heating, may be maintained. This method is also the same as the following humidifying and heating method.

Figure 8:
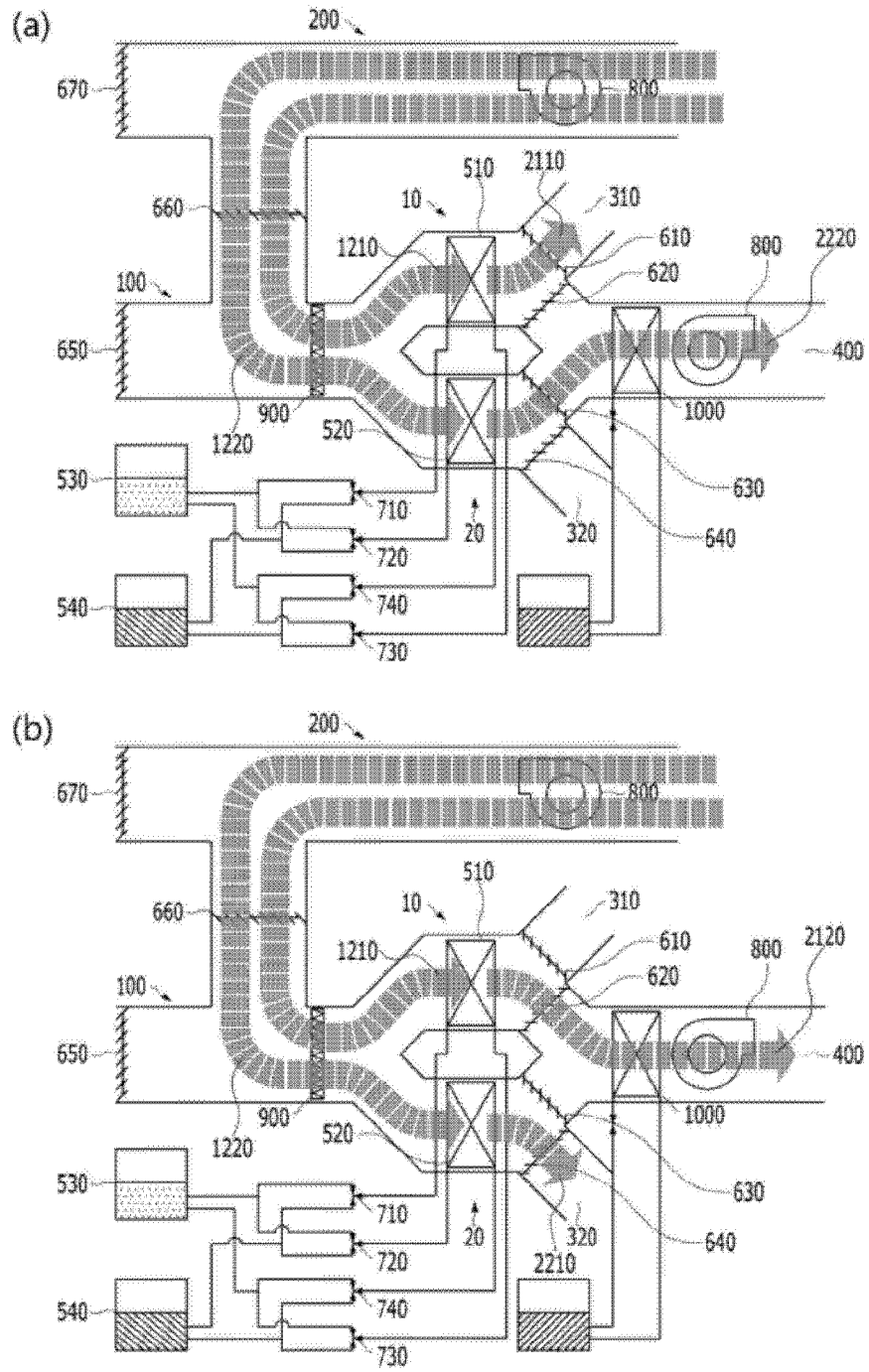
FIG. 8 is a schematic view of an air flow path of an indoor circulation type humidifying and heating method according to the exemplary embodiment of the present invention.

FIG. 8 is a schematic view of an air flow path of an indoor circulation type humidifying and heating method according to the exemplary embodiment of the present invention.

First, as illustrated in FIG. 8A, the first of second front flow path 1210 and the first of first rear flow path 2110 may be formed with respect to the first module 10, the coolant may be inputted to the first heat exchanger 510, and simultaneously, the second of second front flow path 1220 and the second of second rear flow path 2220 may be formed with respect to the second module 20, and the hot water may be inputted to the second heat exchanger 520.

Second, the moisture in the air introduced into the first of second front flow path 1210 may be adsorbed by the moisture absorbent of the first heat exchanger 510, the air from which the moisture has been removed may be discharged to the first of first rear flow path 2110, and simultaneously, the air introduced into the second of second front flow path 1220 may be heated by the second heat exchanger 520, the air may be humidified by the moisture desorbed from the heated moisture absorbent of the second heat exchanger 520, and the air may be discharged to the second of second rear flow path [see FIG. 8A].

Third, the air introduced into the indoor intake port 200 from the interior may flow back to the first of second front flow path 1210 and the second of second front flow path 1220 [see FIG. 8A]

Fourth, as illustrated in FIG. 8B, the first of second front flow path 1210 and the second of first rear flow path 2120 may be formed with respect to the first module 10, the hot water may be inputted to the first heat exchanger 510, and simultaneously, the second of second front flow path 1220 and the first of second rear flow path 2210 may be formed with respect to the second module 20, and the coolant may be inputted to the second heat exchanger 520.

Fifth, the air introduced into the first of second front flow path 1210 may be heated by the first heat exchanger 510, the air is humidified by the moisture desorbed from the heated moisture absorbent of the first heat exchanger 510, and the air may be discharged to the second of first rear flow path, and simultaneously, the moisture in the air introduced into the second of second front flow path 1220 may be adsorbed by the moisture absorbent of the second heat exchanger 520, and the air from which the moisture has been removed may be discharged to the first of second rear flow path 2210 [see FIG. 8B].

Sixth, the air introduced into the indoor intake port 200 from the interior may flow back to the first of second front flow path 1210 and the second of second front flow path 1220 [see FIG. 8B].

The respective steps may be sequentially and repeatedly performed.

It will be appreciated that the exemplary embodiments of the present invention have been described above for purposes of illustration, and those skilled in the art may easily modify the present invention in other specific forms without changing the technical spirit or the essential features of the present invention. Therefore, it should be understood that the above-described exemplary embodiments are illustrative in all aspects and do not limit the present invention. For example, each component described to be of a single type may be implemented in a distributed manner. Likewise, components described to be distributed can be implemented in a combined manner.

The scope of the present invention is represented by the claims to be disclosed below, and it should be interpreted that all the changes or modified forms, which are derived from the meaning and the scope of the claims, and the equivalents thereto, are included in the scope of the present invention.

REFERENCE SIGN(S) LIST

10: First module
20: Second module
100: Outdoor intake port
200: Indoor intake port
310: First outdoor outlet port
320: Second outdoor outlet port
400: Indoor outlet port
510: First heat exchanger
520: Second heat exchanger
530: Hot water tank
540: Coolant tank
610: First separation device
615: Single-blade damper for first of first rear flow path and second of first rear flow path
620: Second separation device
630: Third separation device
635: Single-blade damper for first of second rear flow path and second of second rear flow path
640: Fourth separation device
650: Fifth separation device
660: Sixth separation device
670: Seventh separation device
710: First valve
720: Second valve
730: Third valve
740: Fourth valve
800: Air blower
900: Filter
1000: Cold water coil
1110: First of first front flow path
1120: Second of first front flow path
1210: First of second front flow path
1220: Second of second front flow path
2110: First of first rear flow path
2120: Second of first rear flow path
2210: First of second rear flow path
2220: Second of second rear flow path

What is claimed is:

1. An air handling unit with dehumidification and humidification functions, the air handling unit comprising:
   a first module which performs dehumidification or humidification;
   a second module which performs dehumidification or humidification alternately with the first module;
   an indoor outlet port selectively connected to the first module or the second module, and through which air passing through the first module or the second module is discharged into an interior of a building;
   an outdoor intake port through which outdoor air is introduced, and connected with the first module and the second module through first and second air flow respectively;

a first outdoor outlet port selectively connected to the first air flow path, and through which the air passing through the first module is discharged to an outside of the interior of the building;

a second outdoor outlet port selectively connected to the second air flow path, and through which the air passing through the second module is discharged to the outside of the interior of the building; and an indoor intake port selectively discharging indoor air of the interior to the outside of the interior of the building or to the first module and the second module, wherein the air handling unit is configured to form:
a first of first front flow path in which the outdoor air introduced from the outdoor intake part passes through the first module,
a second of first front flow path in which the outdoor air introduced from the outdoor intake port passes through the second module,
a first of second front flow path in which the indoor air introduced from the indoor intake port passes through the first module, and
a second of second front flow path in which the indoor air introduced from the indoor intake port passes through the second module, wherein while one of the first module and the second module performs adsorption of rails tore in the air passing through the first module or the second module, respectively, the other of the first module and the second module performs desorption of the adsorbed moisture, and the first module and the second module are configured to alternately perform the adsorption and the desorption of the moisture in the air passing their through, respectively.

2. The air handling unit of claim 1, wherein the air handling unit is further configured to form:
a first of first rear flow path in which the air passing through the first module is discharged to the outside of the interior through the first outdoor outlet port;
a second of first rear flow path in which the air passing through the first module is discharged into the interior through the indoor outlet port;
a first of second rear flow path in which the air passing through the second module is discharged to the outside of the interior through the second outdoor outlet port; and
a second of second rear flow path in which the air passing through the second module is discharged into the interior through the indoor outlet port.

3. The air handling unit of claim 2, further comprising:
a first separation device which opens or closes the first of first rear flow path from the first module to the first outdoor outlet port;
a second separation device which opens or closes the second of first rear flow path from the first module to the indoor outlet port;
a third separation device which opens or closes the second of second rear flow path from the second module to the indoor outlet port; and
a fourth separation device which opens or closes the first of second rear flow path from the second module to the second outdoor outlet port.

4. The air handling unit of claim 3, further comprising:
a fifth separation device which allows or blocks a flow of the outdoor air into the outdoor intake unit from the outside of the interior;

a sixth separation device which opens or closes the first of second front flow path and the second of second front flow path from the indoor intake unit to the first module and the second module, respectively; and a seventh separation device which allows or blocks a discharge of the indoor air from the indoor intake unit to the outside of the interior.

5. The air handling unit of claim 3, wherein
the first separation device and the second separation device are configured as one single-blade damper device such that the first of first rear flow path or the second of first rear flow path is selectively formed, and the third separation device and the fourth separation device are configured as one single-blade damper device such that the first of second rear flow path or the second of second rear flow path is selectively formed.

6. The air handling unit of claim 3, wherein
the first module includes a first heat exchanger having a surface coated with a moisture absorbent, and the second module includes a second heat exchanger having a surface coated with a moisture absorbent.

7. The air handling unit of claim 6, wherein
the first heat exchanger and the second heat exchanger each have a function in which an inputted coolant removes heat of adsorption generated due to adsorption while the moisture in the air passing through the first module is adsorbed by the moisture absorbent coating the surface, and a function in which inputted hot water heats the moisture absorbent coating while the moisture adsorbed by the moisture absorbent is desorbed.

8. The air handling unit of claim 6, wherein
the second heat exchanger heats the moisture absorbent coating while the first heat exchanger dehumidifies the air passing through the first module, and the second heat exchanger dehumidifies the air passing through the second module while the first heat exchanger heats the moisture absorbent coating.

9. The air handling unit of claim 6, further comprising:
a hot water tank which supplies hot water to the first heat exchanger and the second heat exchanger and collects the hot water from the first heat exchanger and the second heat exchanger, and a coolant tank which supplies a coolant to the first heat exchanger and the second heat exchanger and collects the coolant from the first heat exchanger and the second heat exchanger.

10. The air handling unit of claim 9, comprising:
a first valve which is connected with the hot water tank and the coolant tank and supplies the hot water or the coolant to the first heat exchanger;
a second valve which is connected with the hot water tank and the coolant tank and supplies the hot water or the coolant to the second heat exchanger;
a third valve which is connected with the hot water tank and the coolant tank and collects the hot water or the coolant from the first heat exchanger; and
a fourth valve which is connected with the hot water tank and the coolant tank and collects the hot water or the coolant from the second heat exchanger.

11. The air handling unit of claim 6, further comprising:
a filter which is provided between the outdoor intake port and the first and second modules so as to purify the air.

12. The air handling unit of claim 6, wherein
the indoor outlet port includes a cold water coil which cools the air dehumidified by the first heat exchanger or the second heat exchanger.

13. The air handling unit of claim 6, comprising:
the first of second front flow path, the second of second front flow path, the second of first rear flow path, and the second of second rear flow path include air blowers which increase a flow velocity and a flow amount of air by using a pressure difference between an intake side and a discharge side.

14. The air handling unit of claim 6, further comprising:
a control unit which controls the first heat exchanger and the second heat exchanger so that adsorption and desorption of moisture are alternately performed by the first heat exchanger and the second heat exchanger, and controls the first separation device to the fourth separation device so as to form the air flow paths.

15. A ventilation type dehumidifying and cooling method using the air handling unit with the dehumidification and humidification functions according to claim 6, the ventilation type dehumidifying and cooling method comprising:
step (a) in which the first of first front flow path and the first of first rear flow path are formed with respect to the first module, hot water is inputted to the first heat exchanger, and simultaneously, the second of first front flow path and the second of second rear flow path are formed with respect to the second module, and a coolant is inputted to the second heat exchanger;
step (b) in which the adsorbed moisture is desorbed from the heated moisture absorbent of the first heat exchanger, the air introduced into the first of first front flow path discharges the moisture to the first of first rear flow path, and simultaneously, the moisture in the air introduced into the second of first front flow path is adsorbed by the moisture absorbent of the second heat exchanger, and the dehumidified air flow to the second of second rear flow path and is cooled by a cold water coil and discharged;
step (c) in which the air introduced into the indoor intake unit from the interior is discharged to the outside of the interior;
step (d) in which the first of first front flow path and the second of first rear flow path are formed with respect to the first module, the coolant is inputted to the first heat exchanger, and simultaneously, the second of first front flow path and the first of second rear flow path are formed with respect to the second module, and the hot water is inputted to the second heat exchanger;
step (e) in which the moisture of the air introduced into the first of first front flow path is adsorbed by the moisture absorbent of the first heat exchanger, the dehumidified air flows to the second of first rear flow path and is cooled by a cold water coil and discharged, and simultaneously, the adsorbed moisture is desorbed from the heated moisture absorbent of the second heat exchanger, and the air introduced into the second of first front flow path discharges the moisture to the first of second rear flow path; and
step (f) in which the air introduced into the indoor intake unit from the interior is discharged to the outside of the interior;
wherein step (a) to step (f) are sequentially and repeatedly performed.

16. An indoor circulation type dehumidifying and cooling method using the air handling unit with the dehumidification and humidification functions according to claim 6, the indoor circulation type dehumidifying and cooling method comprising:
step (a) in which the first of second front flow path and the first of first rear flow path are formed with respect to the first module, hot water is inputted to the first heat exchanger, and simultaneously, the second of second front flow path and the second of second rear flow path are formed with respect to the second module, and a coolant is inputted to the second heat exchanger;
step (b) in which the adsorbed moisture is desorbed from the heated moisture absorbent of the first heat exchanger, the air introduced into the first of second front flow path discharges the moisture to the first of first rear flow path, and simultaneously, the moisture in the air introduced into the second of second front flow path is adsorbed by the moisture absorbent of the second heat exchanger, and the dehumidified air flows to the second of second rear flow path and is cooled by a cold water coil and discharged;
step (c) in which the air introduced into the indoor intake unit from the interior flows back to the first of second front flow path and the second of second front flow path;
step (d) in which the first of second front flow path and the second of first rear flow path are formed with respect to the first module, the coolant is inputted to the first heat exchanger, and simultaneously, the second of second front flow path and the first of second rear flow path are formed with respect to the second module, and the hot water is inputted to the second heat exchanger;
step (e) in which the moisture in the air introduced into the first of second front flow path is adsorbed by the moisture absorbent of the first heat exchanger, the dehumidified air flows to the second of first rear flow path and is cooled by the cold water coil and discharged, and simultaneously, the adsorbed moisture is desorbed from the heated moisture absorbent of the second heat exchanger, and the air introduced into the second of second front flow path discharges the moisture to the first of second rear flow path; and
step (f) in which the air introduced into the indoor intake unit from the interior flows back to the first of second front flow path and the second of second front flow path,
wherein step (a) to step (f) are sequentially and repeatedly performed.

17. A ventilation type humidifying and heating method using the air handling unit with the dehumidification and humidification functions according to claim 6, the ventilation type humidifying and heating method comprising:
step (a) in which the first of first front flow path and the first of first rear flow path are formed with respect to the first module, a coolant is inputted to the first heat exchanger, and simultaneously, the second of first front flow path and the second of second rear flow path are formed with respect to the second module, and hot water is inputted to the second heat exchanger;
step (b) the moisture in the air introduced into the first of first front flow path is adsorbed by the moisture absorbent of the first heat exchanger, the air from which the moisture has been removed is discharged to the first of first rear flow path, and simultaneously, the air introduced into the second of first front flow path is heated by the second heat exchanger, the air is humidified by the moisture desorbed from the heated moisture absorbent of the second heat exchanger, and the air is discharged to the second of second rear flow path;
step (c) in which the air introduced into the indoor intake unit from the interior is discharged to the outside of the interior;

step (d) in which the first of first front flow path and the second of first rear flow path are formed with respect to the first module, the hot water is inputted to the first heat exchanger, and simultaneously, the second of first front flow path and the first of second rear flow path are formed with respect to the second module, and the coolant is inputted to the second heat exchanger;

step (e) in which the air introduced into the first of first front flow path is heated by the first heat exchanger, the air is humidified by the moisture desorbed from the heated moisture absorbent of the first heat exchanger, the air is discharged to the second of first rear flow path, and simultaneously, the moisture in the air introduced into the second of first front flow path is adsorbed by the moisture absorbent of the second heat exchanger, and the air from which the moisture has been removed is discharged to the first of second rear flow path; and step (f) in which the air introduced into the indoor intake unit from the interior is discharged to the outside of the interior;

wherein step (a) to step (f) are sequentially and repeatedly performed.

18. An indoor circulation type humidifying and heating method using the air handling unit with the dehumidification and humidification functions according to claim 6, the indoor circulation type humidifying and heating method comprising:

step (a) in which the first of second front flow path and the first of first rear flow path are formed with respect to the first module, a coolant is inputted to the first heat exchanger, and simultaneously, the second of second front flow path and the second of second rear flow path are formed with respect to the second module, and hot water is inputted to the second heat exchanger;

step (b) in which the moisture in the air introduced into the first of second front flow path is adsorbed by the moisture absorbent of the first heat exchanger, the air from which the moisture has been removed is discharged to the first of first rear flow path, and simultaneously, the air introduced into the second of second front flow path is heated by the second heat exchanger, the air is humidified by the moisture desorbed from the heated moisture absorbent of the second heat exchanger, and the air is discharged to the second of second rear flow path;

step (c) in which the air introduced into the indoor intake unit from the interior flows back to the first of second front flow path and the second of second front flow path;

step (d) in which the first of second front flow path and the second of first rear flow path are formed with respect to the first module, the hot water is inputted to the first heat exchanger, and simultaneously, the second of second front flow path and the first of second rear flow path are formed with respect to the second module, and the coolant is inputted to the second heat exchanger;

step (e) in which the air introduced into the first of second front flow path is heated by the first heat exchanger, the air is humidified by the moisture desorbed from the heated moisture absorbent of the first heat exchanger, the air is discharged to the second of first rear flow path, and simultaneously, the moisture in the air introduced into the second of second front flow path is adsorbed by the moisture absorbent of the second heat exchanger, and the air from which the moisture has been removed is discharged to the first of second rear flow path; and step (f) in which the air introduced into the indoor intake unit from the interior flows back to the first of second front flow path and the second of second front flow path, wherein step (a) to step (f) are sequentially and repeatedly performed.

* * * * *